(12) United States Patent
Shimizu et al.

(10) Patent No.: US 9,131,090 B2
(45) Date of Patent: Sep. 8, 2015

(54) INFORMATION PROCESSING APPARATUS, CONTROL METHOD THEREFOR AND STORAGE MEDIUM

(71) Applicant: CANON KABUSHIKI KAISHA, Tokyo (JP)

(72) Inventors: Koji Shimizu, Tokyo (JP); Keishi Inaba, Yokohama (JP); Kohei Asano, Yokohama (JP); Kiyokazu Umimura, Kawasaki (JP); Yuji Naya, Kawasaki (JP); Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 172 days.

(21) Appl. No.: 13/677,852

(22) Filed: Nov. 15, 2012

(65) Prior Publication Data

US 2013/0145109 A1    Jun. 6, 2013

(30) Foreign Application Priority Data

Dec. 2, 2011    (JP) .................. 2011-265043

(51) Int. Cl.
*G06F 12/00* (2006.01)
*H04N 1/00* (2006.01)
(Continued)

(52) U.S. Cl.
CPC ......... *H04N 1/00477* (2013.01); *G03G 15/502* (2013.01); *G03G 15/5087* (2013.01); *G03G 15/55* (2013.01); *G06F 3/065* (2013.01); *G06F 3/0646* (2013.01); *G06F 3/0647* (2013.01); *G06F 3/0689* (2013.01);
(Continued)

(58) Field of Classification Search
CPC . G06F 3/0689; G06F 3/0647; G06F 11/0727; G06F 11/2056; G06F 3/065; G06F 11/14; G06F 11/1417; G06F 11/1446; G06F 11/1658; G06F 3/0646
See application file for complete search history.

(56) References Cited

U.S. PATENT DOCUMENTS 6,178,520 B1 *   1/2001   DeKoning et al. ........... 714/5.11
6,754,767 B2 *   6/2004   Gold ............................. 711/114
(Continued)

FOREIGN PATENT DOCUMENTS

CN   1632756 A    6/2005
CN   101021769 A   8/2007
(Continued)

OTHER PUBLICATIONS

Nov. 15, 2014 Chinese Official Action in Chinese Patent Appln. No. 201210511266.3.
(Continued)

*Primary Examiner* — Shawn X Gu
(74) *Attorney, Agent, or Firm* — Fitzpatrick, Cella, Harper & Scinto

(57) ABSTRACT

The invention relates to an information processing apparatus which performs mirroring for synchronizing storage contents of a first storage unit and a second storage unit. If mirroring is valid when the information processing apparatus is started, the information processing apparatus detects a storage unit attached to itself. If a detection result indicates that no storage unit has been detected or one storage unit has been detected, the information processing apparatus displays, on a display unit, a connection acknowledgement screen for the storage unit which has not been detected. If the detection result indicates that two storage units have been detected, activation processing is executed for the information processing apparatus.

4 Claims, 9 Drawing Sheets

(51) Int. Cl.
  *G06F 11/07* (2006.01)
  *G06F 11/14* (2006.01)
  *G06F 3/06* (2006.01)
  *G06F 11/20* (2006.01)
  *G03G 15/00* (2006.01)
  *H04N 1/21* (2006.01)
  *H04N 1/32* (2006.01)

(52) U.S. Cl.
  CPC ........... *G06F 11/0727* (2013.01); *G06F 11/14* (2013.01); *G06F 11/1417* (2013.01); *G06F 11/1446* (2013.01); *G06F 11/2056* (2013.01); *H04N 1/00411* (2013.01); *H04N 1/00424* (2013.01); *H04N 1/00474* (2013.01); *H04N 1/00482* (2013.01); *H04N 1/2158* (2013.01); *H04N 1/32625* (2013.01); *H04N 1/32657* (2013.01); *H04N 1/32694* (2013.01); *G03G 2215/00109* (2013.01); *H04N 2201/0094* (2013.01)

(56) References Cited

U.S. PATENT DOCUMENTS

| | | | |
|---|---|---|---|
| 7,089,449 B1 * | 8/2006 | Cluff et al. | 714/15 |
| 7,530,000 B2 | 5/2009 | Fairhurst et al. | |
| 2005/0235109 A1 * | 10/2005 | Ogihara et al. | 711/114 |
| 2007/0234148 A1 | 10/2007 | Fairhurst et al. | |

FOREIGN PATENT DOCUMENTS

| | | |
|---|---|---|
| CN | 101021793 A | 8/2007 |
| JP | 2000-035858 A | 2/2000 |

OTHER PUBLICATIONS

May 4, 2015 Chinese Office Action in Chinese Patent Appln. No. 201210511266.3.

* cited by examiner

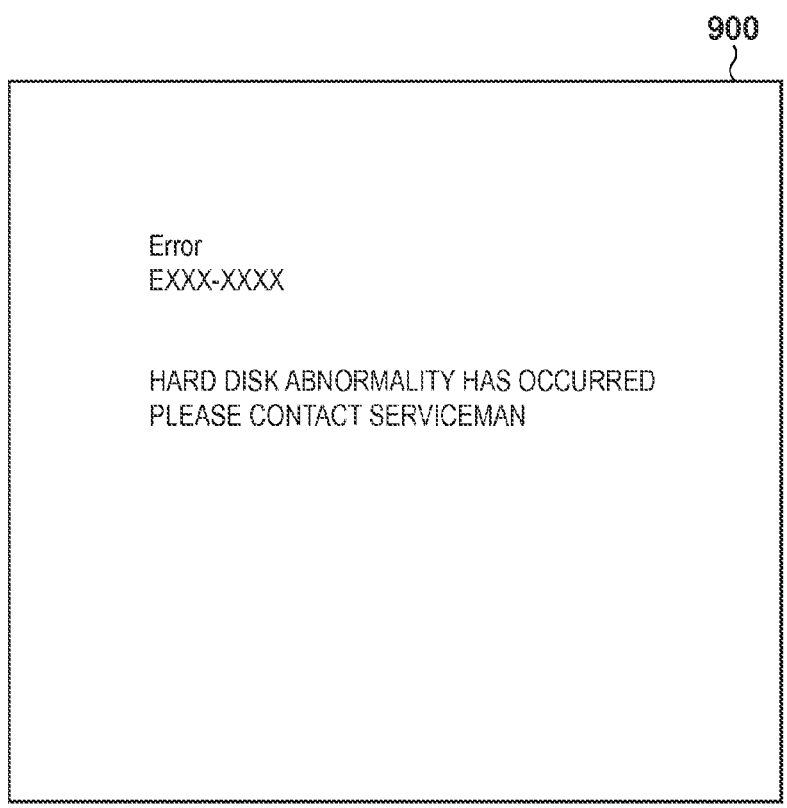

INFORMATION PROCESSING APPARATUS, CONTROL METHOD THEREFOR AND STORAGE MEDIUM

BACKGROUND OF THE INVENTION

1. Field of the Invention

The present invention relates to an information processing apparatus including a storage device such as a semiconductor or magnetic disk, a control method for the information processing apparatus, and a storage medium.

2. Description of the Related Art

Current image forming apparatuses include a storage within themselves to implement various functions such as handling of images and storage of image data. Some image forming apparatuses support the RAID function for mirroring to protect image data stored in the storage by the user. There is known an image forming apparatus from which a storage is detachable so that the storage can be detached and kept in another place while the image forming apparatus is OFF, in order to protect user data and increase the security. Japanese Patent Laid-Open No. 2000-35858 proposes an apparatus which can automatically start mirroring when a new storage is attached.

In a mirror disk control system described in Japanese Patent Laid-Open No. 2000-35858, it is assumed that a storage is detached from the system and kept in another place to protect data within itself. In this case, to activate the mirror disk control system, it is necessary to do that after attaching the storage kept in the other place. If, however, the user inserts the storage by mistake or forgets to attach the storage, and then activates the mirror disk control system, it is activated without recognizing the storage. The mirror disk control system does not assume that the storage has been detached. If, therefore, the system cannot execute mirroring, it determines that the storage has failed. As a result, although the storage has not failed, the user may exchange the storage.

SUMMARY OF THE INVENTION

The present invention enables realization of an information processing apparatus for decreasing the number of unnecessary storage exchange operations by reducing the number of mistakes by user operations, a control method for the information processing apparatus, and a storage medium.

One aspect of the present invention provides an information processing apparatus which performs mirroring for synchronizing storage contents of a first storage unit and a second storage unit, the apparatus comprising: a determination unit that determines, when the apparatus is started, whether the mirroring is valid; a detection unit that detects, if the determination unit has determined that the mirroring is valid, a storage unit attached to the apparatus; and a control unit that displays on a display unit, if a detection result of the detection unit indicates that no storage unit has been detected or one storage unit has been detected, a connection acknowledgement screen for the storage unit which has not been detected.

Another aspect of the present invention provides a control method for an information processing apparatus which performs mirroring for synchronizing storage contents of a first storage unit and a second storage unit, the method comprising: determining, by a determination unit, when the information processing apparatus is started, whether the mirroring is valid; detecting, by a detection unit, if it has been determined in the determining that the mirroring is valid, a storage unit attached to the information processing apparatus; and displaying on a display unit, by a control unit, if a detection result in the detecting indicates that no storage unit has been detected or one storage unit has been detected, a connection acknowledgement screen for the storage unit which has not been detected.

Still another aspect of the present invention provides an information processing apparatus comprising: a mirroring unit that synchronizes data stored in a first storage unit with a second storage unit; a detection unit that detects, when the apparatus is activated, a storage unit attached to the apparatus; and a control unit that executes, if the detection unit has detected the first storage unit and the second storage unit, activation processing for the apparatus, and displays, if the detection unit has not detected the first storage unit or the second storage unit, information associated with a detection result of the detection unit on a display unit.

Yet still another aspect of the present invention provides a control method for an information processing apparatus, comprising: synchronizing data stored in a first storage unit with a second storage unit; detecting, when the information processing apparatus is activated, a storage unit attached to the information processing apparatus; and executing, if both the first storage unit and the second storage unit have been detected in the detecting, activation processing for the information processing apparatus, and displaying, if the first storage unit or the second storage unit has not been detected in the detecting, information associated with a detection result in the detecting on a display unit.

Still yet another aspect of the present invention provides a computer-readable storage medium storing a computer program for causing a computer to execute each step of a control method for an information processing apparatus.

Further features of the present invention will become apparent from the following description of exemplary embodiments with reference to the attached drawings.

BRIEF DESCRIPTION OF THE DRAWINGS

FIG. 6 is a view showing an error message displayed on an LCD display unit 900 according to the embodiment;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Arrangement of Image Forming Apparatus>

Figure 1:
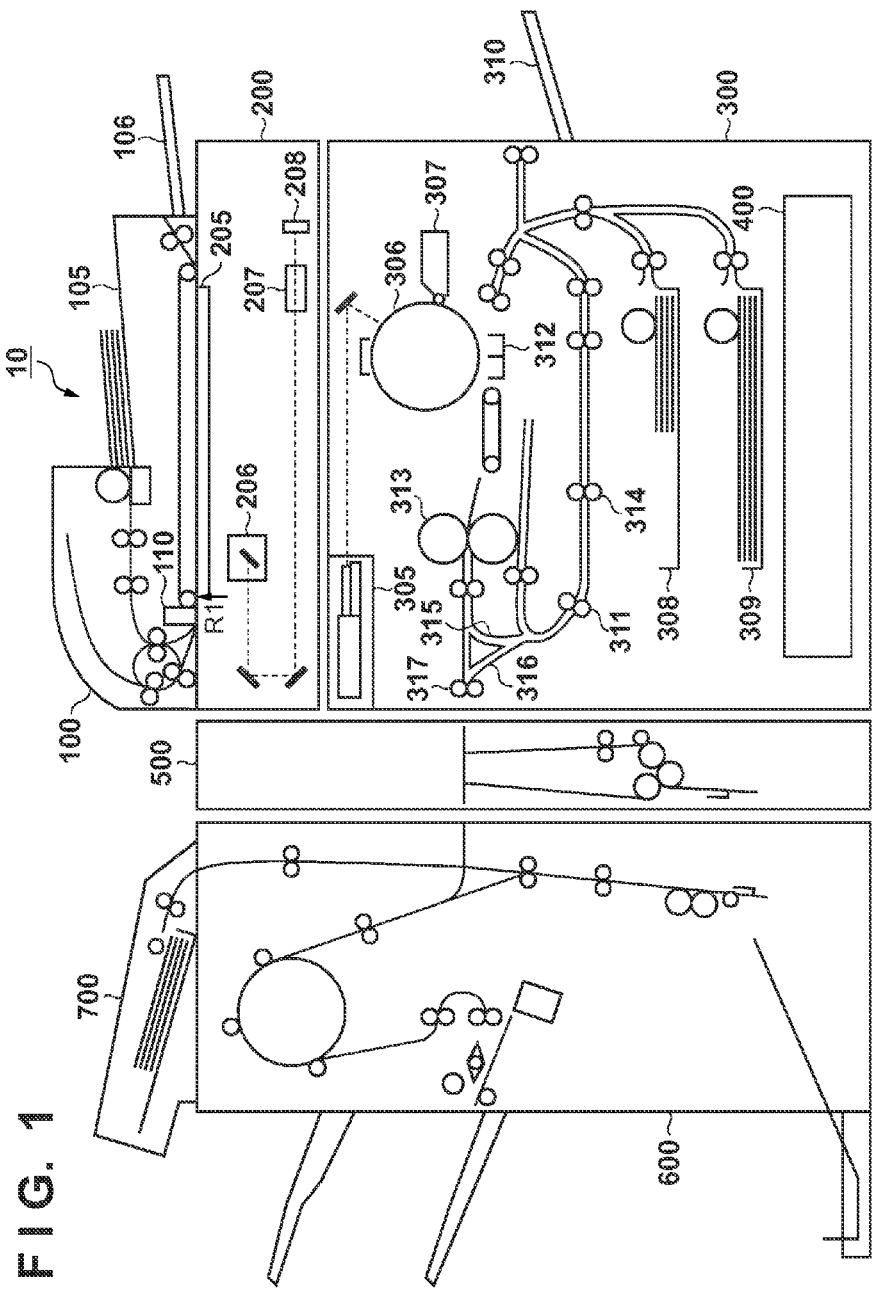
FIG. 1 is a view showing the arrangement of an image forming apparatus.

An example of the arrangement of an image forming apparatus according to an embodiment will be described with reference to FIG. 1. In the embodiment, as an example of an information processing apparatus, an image forming apparatus 10 will be explained. The present invention, however, is not limited to this, and is applicable to any information processing apparatus from which a plurality of storages are detachable (to which a plurality of storages can be attached), and which performs mirroring of the storages. The image forming apparatus 10 includes an image forming apparatus main body formed by an image reader 200 and a printer unit 300, a folding device 500, and a finisher 600. An original conveyance device 100 is attached on the image reader 200.

The original conveyance device 100 feeds originals set on an original tray 105 one by one from the top, and conveys the fed original onto a glass original table 205 through a curved path. A one-sided original reading method includes an original fixed reading mode in which the trailing edge of an original is conveyed to a reading position R1 on the glass original table 205, and a scanner unit 206 is moved from left to right to read the original. The one-sided original reading method also includes an original flow reading mode in which an original is conveyed to the reading position R1 at a given reading speed, and the scanner unit 206 is fixed at the reading position R1 to read the original. In either mode, the read original is discharged onto a discharge tray 106. As an example of a double-sided original reading method, the scanner unit 206 reads the front surface of an original, and an optical unit 110 arranged within the original conveyance device 100 is used to read the back surface of the original. A detailed description will be provided later. An image sensor, a light source, and the like (neither of which are shown) are arranged within the optical unit 110.

An image of an original read by an image sensor 208 through a lens 207 is sent to an exposure control unit 305 via a printer control unit 301 (to be described later). The exposure control unit 305 outputs a laser beam corresponding to an image signal to a photosensitive drum 306. When the photosensitive drum 306 is irradiated with the laser beam, an electrostatic latent image is formed on the photosensitive drum 306. A developing unit 307 develops the electrostatic latent image on the photosensitive drum 306, and a transfer unit 312 transfers a developer on the photosensitive drum 306 to a sheet fed from a cassette 308 or 309, a manual paper feed unit 310, or double-sided conveyance path 311.

The sheet on which the developer has been transferred is conveyed to a fixing unit 313, which then executes developer fixing processing. A flapper (not shown) temporarily guides the sheet having passed through the fixing unit 313 from a path 315 to a path 314. After the trailing edge of the sheet passes through the path 315, the sheet is switched back, and is guided from a path 316 to a discharge roller 317. This enables to discharge the sheet from the printer unit 300 through the discharge roller 317 while the surface of the sheet on which the developer has been transferred faces downward (face down). This operation is called reverse discharge. Discharging the sheet face down enables to execute image forming processing in the correct order of pages from the top when, for example, printing images obtained by reading a plurality of originals using the original conveyance device 100. Note that when images are formed on a hard sheet such as an OHP sheet from the manual paper feed unit 310, the sheet is discharged from the discharge roller 317 while the surface of the sheet on which the developer has been transferred faces upward (face up), without guiding the sheet to the path 315.

If images are formed on both the surfaces of a sheet, the sheet is guided from the fixing unit 313 to the path 315 and to the path 314. The sheet is switched back immediately after the trailing edge of the sheet passes through the path 315, and the flapper (not shown) guides the sheet to the double-sided conveyance path 311. The transfer unit 312 transfers an electrostatic latent image on the sheet guided to the double-sided conveyance path 311, and the fixing unit 313 executes fixing processing. As described above, a path length, a roller arrangement, and a drive system are so adjusted that conveyance is possible even if five half-size paper sheets such as A4 or B5 paper sheets are in a path from the transfer unit 312 back to the transfer unit 312 through the double-sided conveyance path 311. Note that the discharge page order by these processes can comply with the order in a double-sided copy operation, since odd-numbered pages are discharged face down.

A sheet discharged from the discharge roller 317 is sent to the folding device 500. The folding device 500 executes Z-folding processing for the sheet. When folding processing is designated for an A3- or A4-size sheet, the sheet is sent to the finisher 600 after the folding device 500 executes folding processing. Sheets with other sizes are directly sent to the finisher 600. The finisher 600 executes bookbinding processing, binding processing, punching processing, and the like. An inserter 700 is provided on the finisher 600 to feed a front cover, an interleaf, and the like to the finisher 600.

<Control Configuration of Image Forming Apparatus>

Figure 2:
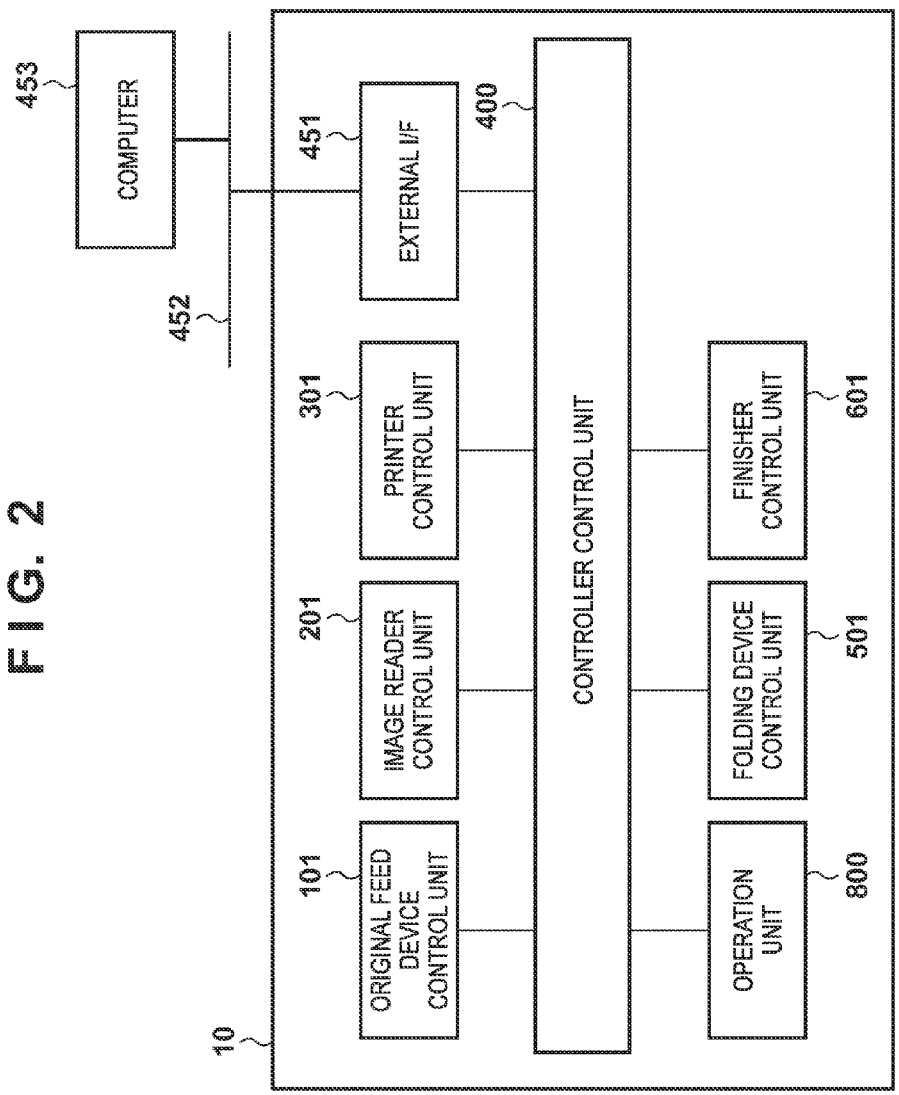
FIG. 2 is a block diagram showing the control configuration of the image forming apparatus.

The control configuration of the image forming apparatus will be described with reference to FIG. 2. As shown in FIG. 2, the image forming apparatus 10 includes a controller control unit 400, an original feed device control unit 101, an image reader control unit 201, the printer control unit 301, an external I/F 451, a folding device control unit 501, a finisher control unit 601, and an operation unit 800. The controller control unit 400 communicates with the image reader 200, printer unit 300, folding device 500, and finisher 600, and controls the image forming apparatus 10 as a whole.

Based on settings of the operation unit 800 or an instruction from an external computer 453, the controller control unit 400 communicates with the original feed device control unit 101 for controlling the original conveyance device 100, and the image reader control unit 201 for controlling the image reader 200. The controller control unit 400 acquires the image data of the read original through the communication. The unit 400 also communicates with the printer control unit 301 for controlling the printer unit 300, and prints the image data on a sheet. Furthermore, the controller control unit 400 communicates with the folding device control unit 501 for controlling the folding device 500, and the finisher control unit 601 for controlling the finisher 600, and outputs, for example, printed sheets undergone stapling or punching as desired.

The external I/F 451 serves as an interface for connecting with the external computer 453. The external I/F 451 rasterizes print data from the external computer 453 connected by a network or an external bus 452 such as a USB into an image to output it, and transmits image data within a hard disk 407 (to be referred to as an HDD hereinafter) (to be described later) to the external computer 453.

<Arrangement of Controller Control Unit>

Figure 3:
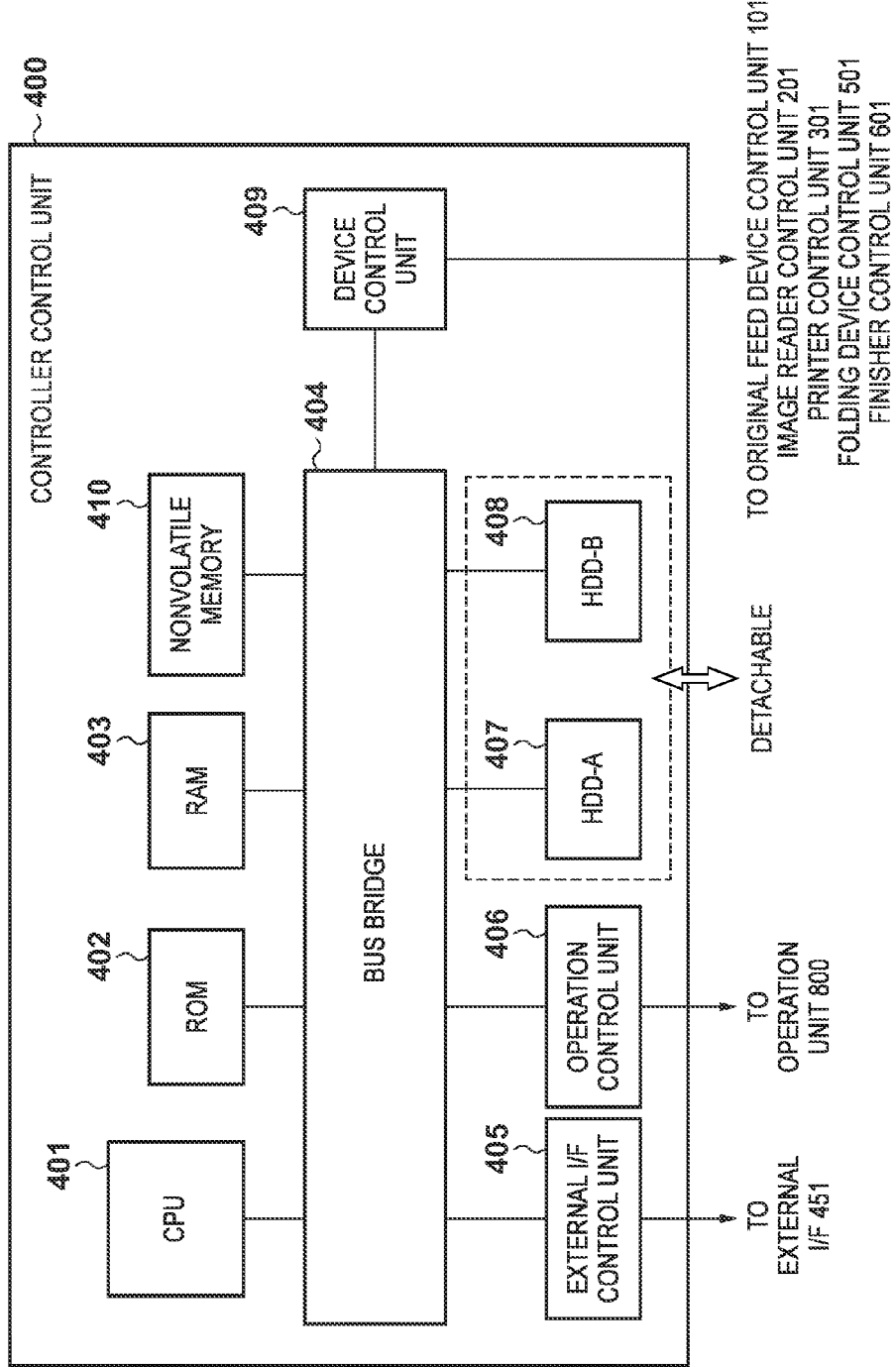
FIG. 3 is a block diagram showing the arrangement of a controller control unit 400.

The arrangement of the controller control unit 400 according to the embodiment will be described with reference to FIG. 3. As shown in FIG. 3, the controller control unit 400 includes a CPU 401, a ROM 402, a RAM 403, a nonvolatile memory 410, a device control unit 409, an external I/F control unit 405, an operation control unit 406, the HDD-A (a first storage unit) 407, and an HDD-B (a second storage unit) 408. The components are connected with each other through a bus bridge 404. Note that the HDD-A 407 and HDD-B 408 may be provided to be detachable from the image forming apparatus 10, or to be fixed to the image forming apparatus 10.

The controller control unit 400 is comprehensively controlled by the CPU 401, and is controlled by an operating system (to be referred to as an OS hereinafter). The bus bridge 404 temporarily holds control data for the CPU 401 and the ROM 402 storing the initial activation program of the CPU 401, and is connected with the RAM 403 which is used as a work area for computations performed in a control operation.

The HDD-A 407 stores a main program including the OS of the CPU 401, and is used as a storage area for image data acquired by the user or data obtained by editing an image through the operation unit 800 (to be described later). Furthermore, the external I/F control unit 405 for controlling a network or USB interface, and the operation control unit 406 for controlling the operation unit 800 are connected to the bus bridge 404.

The CPU 401 communicates with the device control unit 409 through the bus bridge 404. The device control unit 409 is connected with the original feed device control unit 101, image reader control unit 201, printer control unit 301, folding device control unit 501, and finisher control unit 601, and controls them.

The HDD-B 408 serves as a secondary storage used as the RAID function for mirroring in an HDD controller (not shown) within the bus bridge 404. The HDD-B 408 is not always necessary to operate the image forming apparatus 10, and is used to use the RAID function for mirroring when, for example, it is desirable to reliably protect image data selected by the user within the HDD-A. The HDD-A 407 and HDD-B 408 may be configured to be mechanically detachable. This is not always required to operate the image forming apparatus 10. The HDD is normally fixed, but the user can select whether to make the HDD detachable. As described above, as a method of attaching the HDD to the image forming apparatus, the user can select one of four connection methods depending on whether to use the RAID function for mirroring, and whether to make the HDD detachable or to fix the HDD.

The nonvolatile memory 410 stores settings to be used by the user in the image forming apparatus 10. In this embodiment, the nonvolatile memory 410 is used to store data for identifying whether the RAID function for mirroring is in use, and whether to make the HDD detachable or to fix the HDD. Although in this embodiment, the nonvolatile memory 410 stores data for identifying whether the RAID function for mirroring is in use, and whether to make the HDD detachable or to fix the HDD, a method of automatically detecting it in real time may be used.

<Arrangement of Operation Unit 800>

Figure 4:
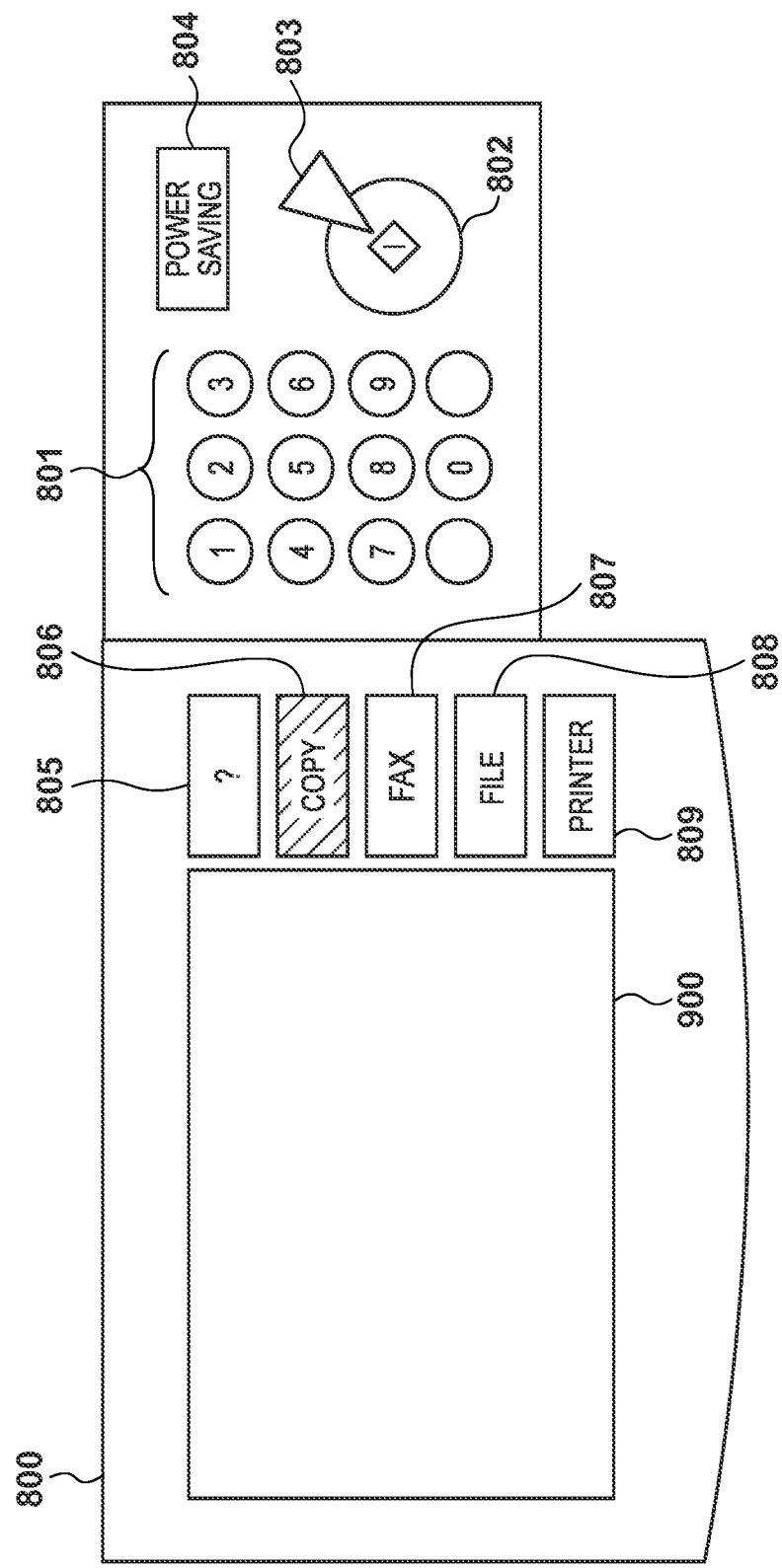
FIG. 4 is a view showing the arrangement of an operation unit 800 of the image forming apparatus.

The arrangement of the operation unit 800 of the image forming apparatus 10 will be described with reference to FIG. 4. An LCD display unit 900 has a touch panel sheet laminated on an LCD, and displays the operation screen of the system. If a displayed key is pressed, the LCD display unit 900 notifies the controller control unit 400 of the position information of the pressed key. A ten-key pad 801 is used to input a number such as the number of copies. A start key 802 is used to start a copy operation or an original reading operation after setting conditions desired by the user. A stop key 803 is used to stop an operation in progress. A power saving key 804 is used by the user to transit to a power saving mode or to return to a normal mode. Note that although the ten-key pad 801, start key 802, stop key 803, and power saving key 804 are provided as hardware keys, the present invention is not limited to this. These keys may be provided as software keys displayed on the LCD display unit 900.

Reference numeral 805 denotes a guide key, which is used to display a description of a key when the function of the key is unknown; 806, a copy mode key, which is pressed to perform a copy operation; 807, a FAX key, which is pressed to make settings associated with a FAX function; 808, a file key, which is pressed to output file data; and 809, a printer key, which is used to make settings associated with a printout from an external apparatus such as a computer.

<Detection of Storage Device>

Figure 5A:
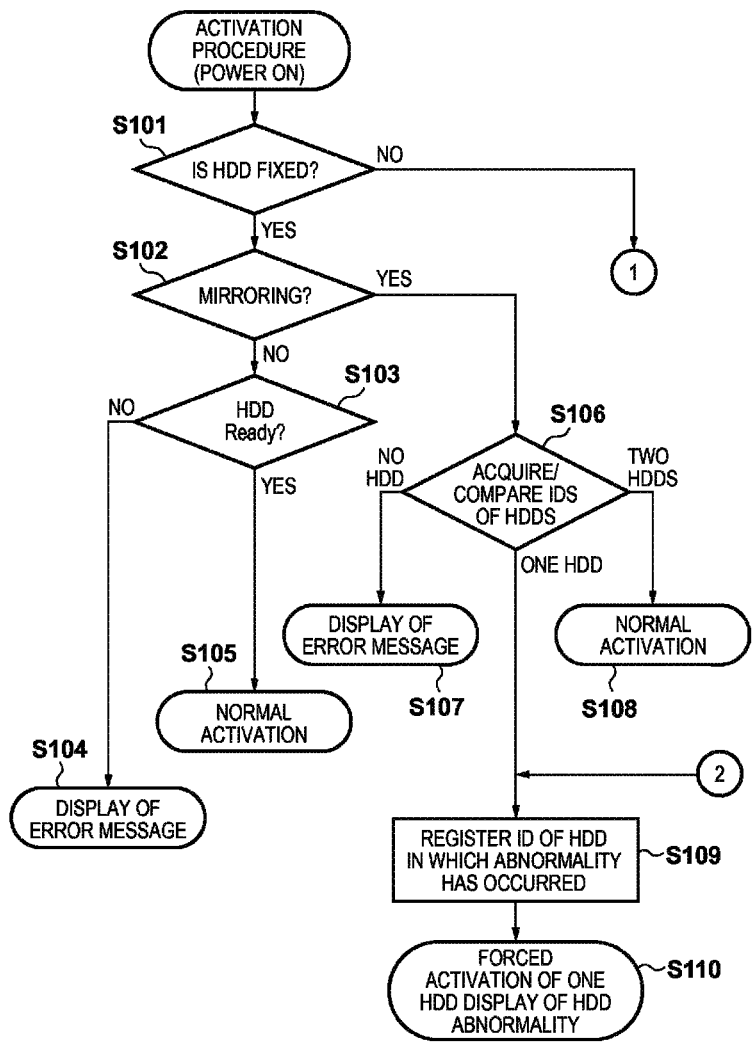
FIGS. 5A and 5B are flowcharts illustrating a processing procedure when the image forming apparatus is powered on according to an embodiment.
Figure 5B:
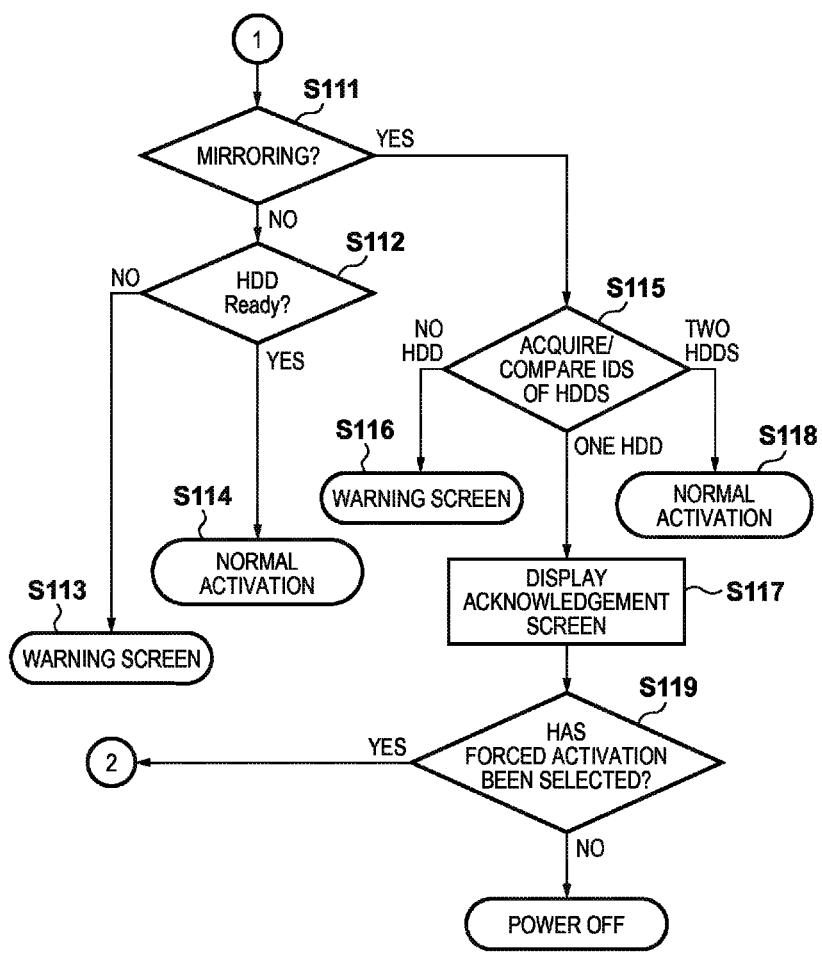

Processing of detecting the storage device of the image forming apparatus 10 will be described in detail with reference to FIGS. 5A and 5B. FIGS. 5A and 5B shows a processing procedure of detecting the connection of a storage device when the image forming apparatus 10 is powered on. Note that processing to be described below is implemented when the CPU 401 of the controller control unit 400 reads out a control program stored in a memory such as the ROM 402 into the RAM 403, and executes it. A flowchart shown in FIGS. 5A and 5B illustrates four control operations depending on whether the RAID function for mirroring is valid and whether to make the HDD detachable or to fix the HDD. Note that mirroring indicates a control operation of synchronizing the storage contents of a plurality of storage devices. The RAID (Redundant Arrays of Inexpensive Disks) function indicates a function of managing a plurality of external storage devices (a hard disk and the like) as one device. The RAID function distributes and records data, thereby increasing the speed and improving the tolerance.

In step S101, the CPU 401 acquires, from the nonvolatile memory 410, information indicating whether the HDD is fixed to or detachable from the image forming apparatus 10. If the HDD is fixed, the process advances to step S102; otherwise, the process advances to step S111. In step S102, the CPU 401 acquires, from the nonvolatile memory 410, whether the RAID function for mirroring is valid. If the RAID function for mirroring is valid, the process advances to step S106; otherwise, the process advances to step S103.

In step S103, the CPU 401 determines whether the HDD-A 407 is ready. If the HDD-A 407 is ready, the process advances to step S105 in which the CPU 401 executes activation processing from a program in the HDD-A 407. On the other hand, if the HDD-A 407 is not ready, the process advances to step S104 in which the CPU 401 displays an error message on the LCD display unit 900, as shown in FIG. 6. The displayed error message shown in FIG. 6 includes information indicating that a hard disk abnormality has occurred, and an error number.

On the other hand, if it is determined in step S102 that the RAID function for mirroring is valid, the process advances to step S106 in which the CPU 401 detects the storage of the image forming apparatus 10. More specifically, the CPU 401 acquires the pieces of serial ID (identifier) information of the HDD-A 407 and HDD-B 408. Furthermore, the pieces of serial ID information of the HDD-A 407 and HDD-B 408 have been registered in advance in the nonvolatile memory 410 when setting the RAID function for mirroring, and the CPU 401 compares the registered values with the acquired ones. If the comparison result (detection result) of comparison of the IDs registered in advance in the nonvolatile memory 410 with the pieces of serial ID information of the HDD-A 407 and HDD-B 408 indicates that there is no matching serial ID information, the process advances to step S107. If the comparison result indicates that there is one piece of matching serial ID information, the process advances to step S109. If the comparison result indicates that there are two pieces of matching serial ID information, the process advances to step S108.

Figure 7:
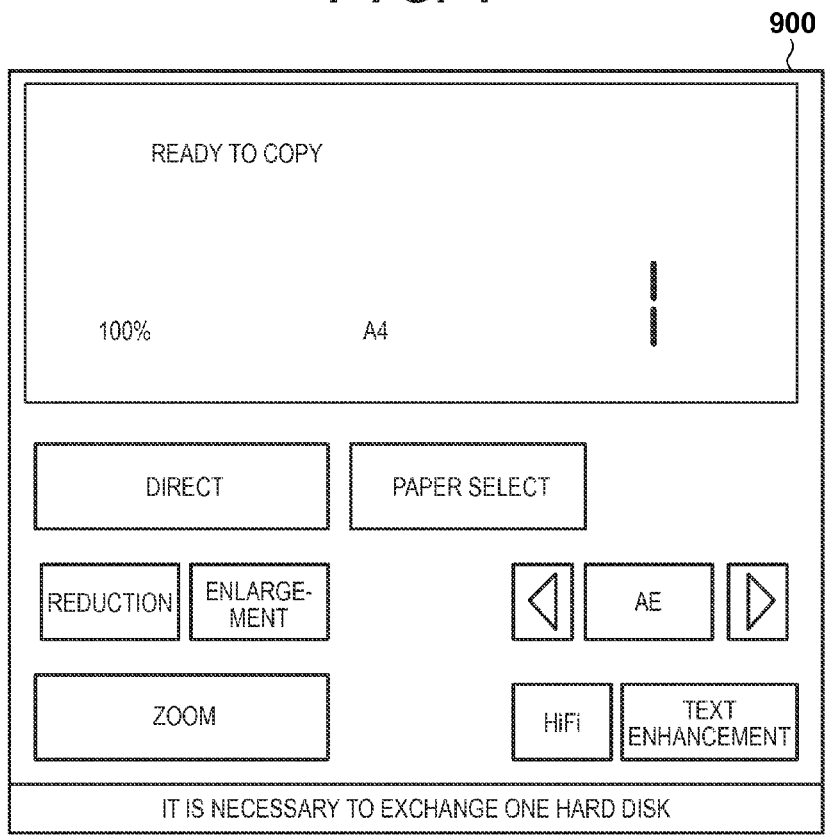
FIG. 7 is a view showing the LCD display unit 900 when one HDD cannot detected while a RAID function is in use according to the embodiment.

If the IDs of the two HDDs cannot be acquired, the CPU 401 displays the error message on the LCD display unit 900 as shown in FIG. 6 in step S107. If the IDs of the two HDDs respectively match the registered IDs, the process advances to step S108 in which the CPU 401 executes activation processing from the program in the HDD-A 407 as a master. On the other hand, if the ID of one of the HDDs can be acquired, and the ID of the other HDD cannot be acquired, the process advances to step S109 in which the CPU 401 determines that it is impossible to continue the RAID function for mirroring, and registers, as a failed HDD, the serial ID of the HDD which cannot be detected. After that, in step S110, the CPU 401 executes activation processing from a program in the HDD, the ID of which has been acquired and which has no problem, and displays, on the LCD display unit 900, information indicating that one HDD has failed, as shown in FIG. 7.

On the other hand, if it is determined in step S101 that the HDD is detachable, the process advances to step S111 in which the CPU 401 acquires, from the nonvolatile memory 410, information indicating whether the RAID function for mirroring is valid. If it is determined based on the acquired information that the RAID function for mirroring is invalid, the process advances to step S112; otherwise, the process advances to step S115.

In step S112, the CPU 401 determines whether the HDD-A 407 is ready. If the HDD-A 407 is ready, the process advances to step S114 in which the CPU 401 executes activation processing from the program in the HDD-A 407. On the other hand, if the HDD-A 407 is not ready, the process advances to step S113 in which the CPU 401 displays a warning message for HDD connection acknowledgement as shown in a screen 901 of FIG. 8.

If it is determined in step S111 that the RAID function for mirroring is valid, the process advances to step S115 in which the CPU 401 acquires the pieces of serial ID information of the HDD-A 407 and HDD-B 408. The pieces of serial ID information of the HDD-A 407 and HDD-B 408 have been registered in advance in the nonvolatile memory 410 when setting the RAID function for mirroring, and the CPU 401 compares the registered values with the acquired ones. If the result of comparison of the IDs registered in advance in the nonvolatile memory 410 with the pieces of serial ID information of the HDD-A 407 and HDD-B 408 indicates that there is no matching serial ID information, the process advances to step S116. If the result indicates that there is one piece of matching serial ID information, the process advances to step S117. If the result indicates that there are two pieces of matching serial ID information, the process advances to step S118.

Figure 8:
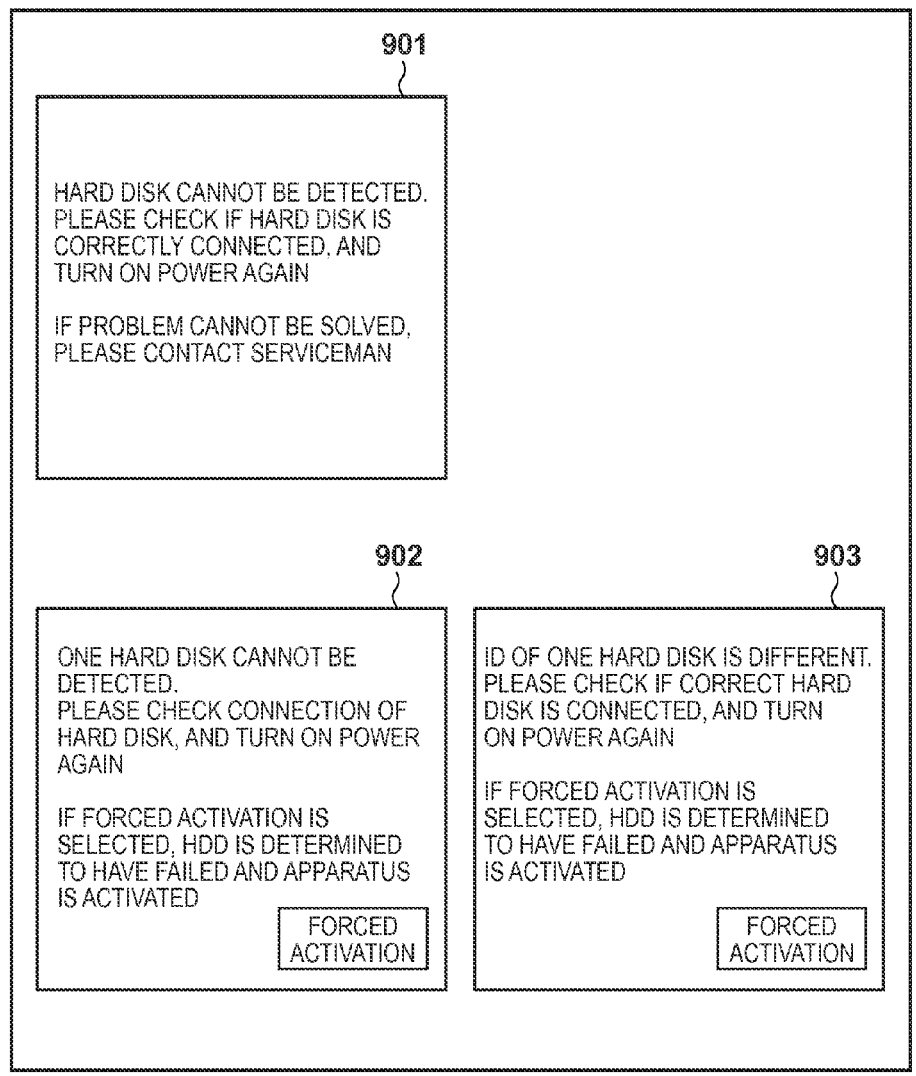
FIG. 8 is a view showing examples of the display of the LCD display unit 900 according to the embodiment.

If the IDs of the two HDDs cannot be acquired, the CPU 401 displays the warning message for connection acknowledgement as shown in the screen 901 of FIG. 8 in step S116. Furthermore, since a detachable HDD is used, a different HDD may be connected and thus an ID may be different. Assuming such a situation, the CPU 401 may display the warning message for connection acknowledgement as shown in the screen 901 of FIG. 8. On the other hand, if the IDs of the two HDDs respectively match the registered IDs, the process advances to step S118 in which the CPU 401 executes activation processing from the program in the HDD-A 407 as a master.

If the ID of one of the HDDs can be acquired, and the ID of the other HDD cannot be acquired, the process advances to step S117 in which the CPU 401 determines that it is impossible to continue the RAID function for mirroring, and displays a connection acknowledgement screen like a screen 902 shown in FIG. 8. As shown in FIG. 8, a forced activation button is displayed on the screen 902. When the forced activation button is pressed, activation processing is executed for the image forming apparatus 10 using the storage contents of the detected storage. In step S119, the CPU 401 prompts the user to select whether to forcibly activate the apparatus or to make a reconnection through the screen displayed in step S117. If the ID of one HDD is different, the CPU 401 may display a connection acknowledgement screen like a screen 903 shown in FIG. 8.

If the user selects to forcibly activate the apparatus in step S119, the process returns to step S109 in which the CPU 401 registers, as a failed HDD, the hard disk with the serial ID which cannot be detected, and executes activation processing from a program in the HDD, the ID of which has been acquired in step S110 and which has no problem. Furthermore, the CPU 401 displays, on the LCD display unit 900, the information indicating that one HDD has failed, as shown in FIG. 7.

On the other hand, if the HDD which has not been detected is reconnected, the user turns off the image forming apparatus 10 and turns it on again, thereby enabling to repeat the procedure shown in FIGS. 5A and 5B. Alternatively, a method of performing a hot-plug detection operation may be used, in which while the power is ON, the user detaches the HDD and attaches it again to make the apparatus re-recognize it.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-265043 filed on Dec. 2, 2011, which is hereby incorporated by reference herein in its entirety.

What is claimed is:

1. An information processing apparatus comprising:
a mirroring unit that performs mirroring for synchronizing storage contents of a first storage unit and a second storage unit;
a control unit that displays on a display unit, if one storage unit, among the first storage unit and the second storage unit, for which the mirroring is performed, is not attached, a screen for accepting an instruction that the apparatus is activated using information stored in another storage unit attached when accepting the instruction;
a registration unit that (i) does not register the one storage unit as a failed storage unit before accepting the instruction via the screen, and (ii) registers the one storage unit as the failed storage unit after accepting the instruction via the screen,
an acquisition unit that acquires an identifier from each of the first storage unit and the second storage unit when an activation of the apparatus has been instructed; and a comparison unit that compares an identifier acquired by said acquisition unit with an identifier held in advance in said apparatus, wherein said control unit displays on the display unit, if a comparison result of said comparison unit indicates that there is one matching identifier, the screen for accepting the instruction that the apparatus is activated using the information stored in the other storage unit which the matching identifier is matched, wherein a processor is included in the apparatus.

2. The apparatus according to claim 1, wherein the screen includes a forced activation button for accepting the instruction that the apparatus is activated using information stored in the other storage unit, and wherein the control unit activates, when a user selects the forced activation button, the apparatus using the information stored in the other storage unit.

3. A control method for an information processing apparatus, the method comprising:

a performing step of performing mirroring for synchronizing storage contents of a first storage unit and a second storage unit;

a displaying step of displaying on a display unit, by a control unit, if one storage unit, among the first storage unit and the second storage unit, for which the mirroring is performed, is not attached, a screen for accepting an instruction that the apparatus is activated using information stored in another storage unit attached when accepting the instruction;

a registering step of (i) not registering the one storage unit as a failed storage unit before accepting the instruction via the screen, and (ii) registering the one storage unit as the failed storage unit after accepting the instruction via the screen;

an acquisition step of acquiring an identifier from each of the first storage unit and the second storage unit when an activation of the apparatus has been instructed;

a comparison step of comparing an identifier acquired by said acquisition unit with an identifier held in advance in said apparatus; and a second displaying step of displaying on the display unit, if a comparison result of said comparison unit indicates that there is one matching identifier, a screen for accepting an instruction that the apparatus is activated using information stored in the other storage unit which the matching identifier is matched.

4. A non-transitory computer-readable storage medium storing a computer program for causing a computer to execute each step of a control method for an information processing apparatus according to claim 3.

* * * * *